(12) United States Patent
Kroell

(10) Patent No.: US 10,275,120 B2
(45) Date of Patent: Apr. 30, 2019

(54) MEDICAL IMAGING APPARATUS AND METHOD FOR THE OPERATION THEREOF

(71) Applicant: Siemens Healthcare GmbH, Erlangen (DE)

(72) Inventor: Maria Kroell, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 56 days.

(21) Appl. No.: 15/585,282

(22) Filed: May 3, 2017

(65) Prior Publication Data

US 2017/0322685 A1   Nov. 9, 2017

(30) Foreign Application Priority Data

May 3, 2016   (DE) .................. 10 2016 207 648

(51) Int. Cl.
  *G06F 3/0482*   (2013.01)
  *G06T 1/00*   (2006.01)

(52) U.S. Cl.
  CPC .......... *G06F 3/0482* (2013.01); *G06T 1/0007* (2013.01); *G06T 2200/24* (2013.01)

(58) Field of Classification Search
  CPC .. G06F 3/0482; G06T 1/0007; G06T 2200/24
  See application file for complete search history.

(56) References Cited

U.S. PATENT DOCUMENTS

| | | | |
|---|---|---|---|
| 9,235,889 B1 * | 1/2016 | Frenkel | ................. G06F 19/321 |
| 2004/0246270 A1 | 12/2004 | Krishnamurthy et al. | |
| 2013/0308839 A1 * | 11/2013 | Taylor | ................... G06F 19/321 |
| | | | 382/128 |
| 2016/0092634 A1 | 3/2016 | Kroell | |

* cited by examiner

*Primary Examiner* — Jeffrey A Gaffin
*Assistant Examiner* — Ayesha E Huertas Torres
(74) *Attorney, Agent, or Firm* — Schiff Hardin LLP

(57) ABSTRACT

In a medical imaging apparatus and a method for the operation thereof, on at least one processed image, an evaluation field to evaluate the image quality of the at least one image is displayed.

8 Claims, 5 Drawing Sheets

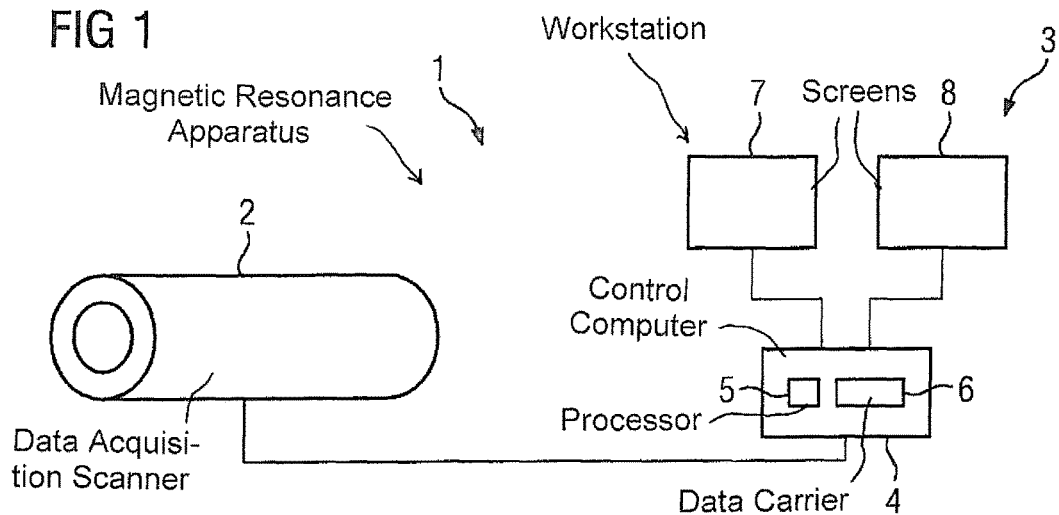
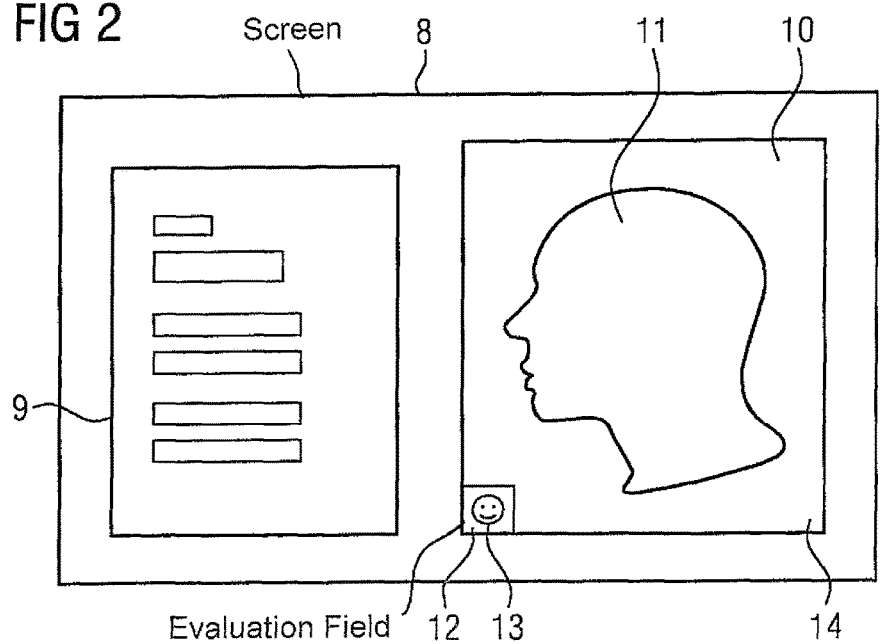

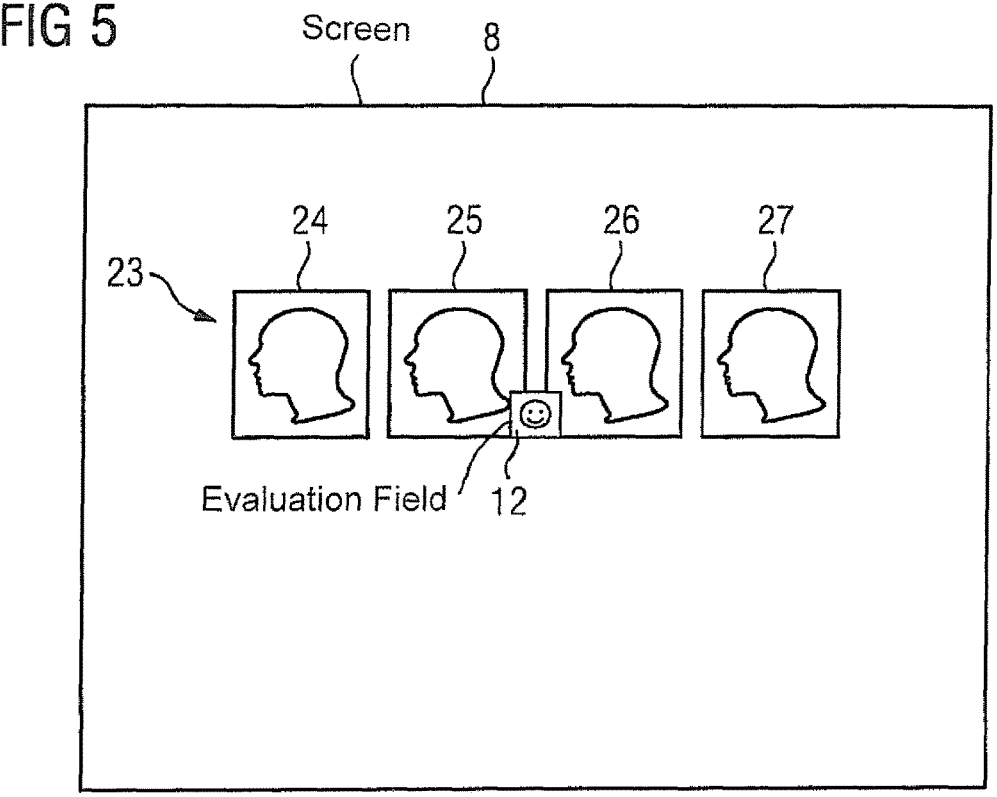

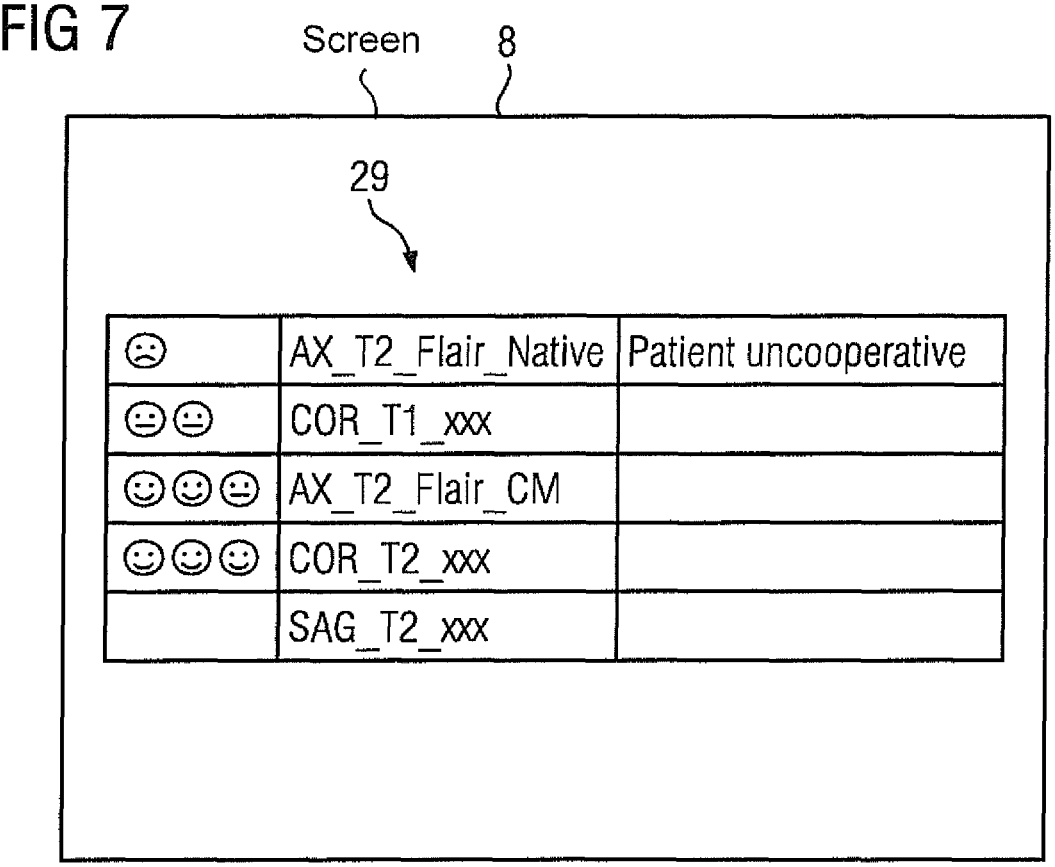

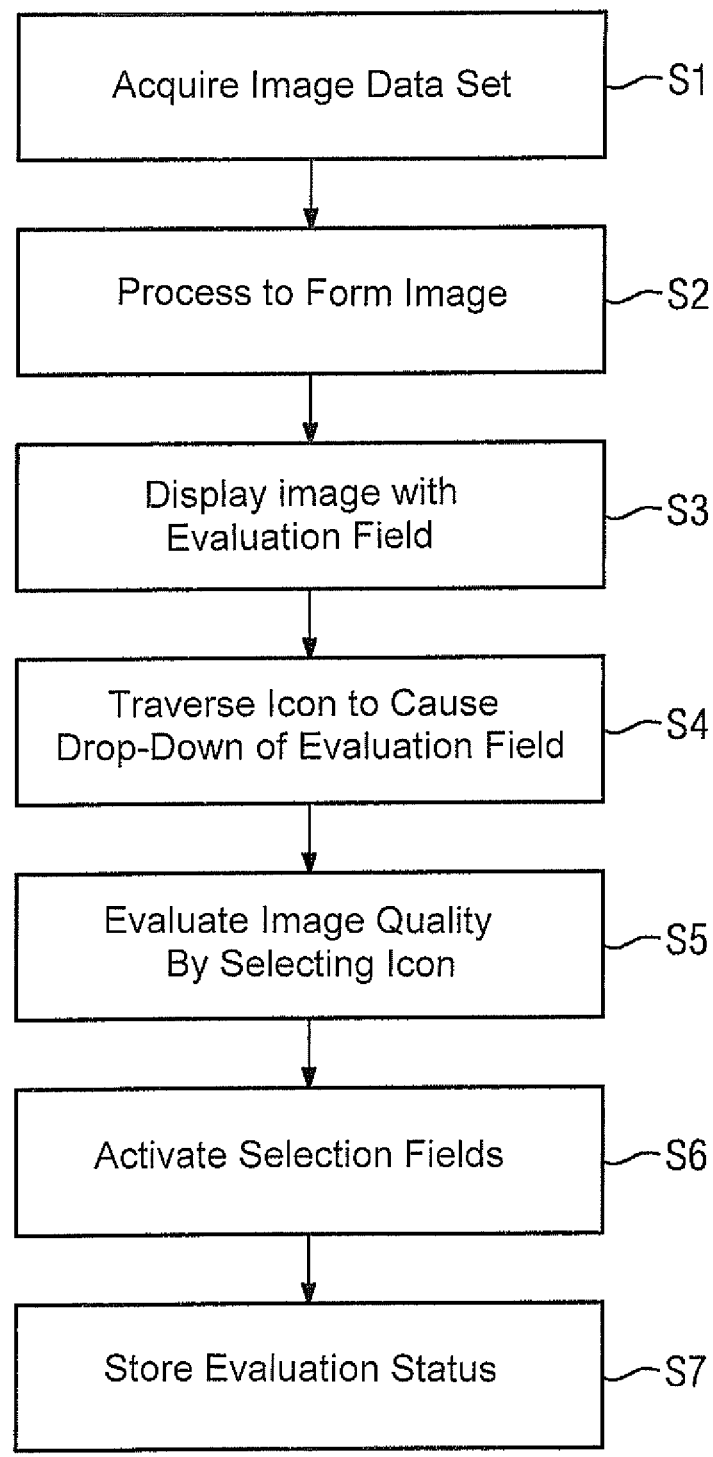

MEDICAL IMAGING APPARATUS AND METHOD FOR THE OPERATION THEREOF

BACKGROUND OF THE INVENTION

Field of the Invention

The invention relates to a method for operating a medical imaging apparatus, as well as a medical imaging apparatus that implements such a method.

Description of the Prior Art

It is usual with imaging modalities, in particular in the clinical field, for a number of physicians, in particular radiologists, to be working at the same time at an imaging apparatus. Sometimes, particular technical experts, who are intended to oversee the smooth running of the measurements, are also available for these systems.

Nevertheless, these technical experts are not present at every examination, or are not even available at all. In any case, they are usually called only when an examination is at risk of failing completely.

If the SNR is merely a little below average, the measurement is usually followed through.

If problems occur in the evaluation of the measurement data that have been acquired and processed into images, this is often considered to be a one-off diagnosis problem. Only when increasingly serious problems repeatedly occur in the image analysis in the case of certain images, such as cardiac perfusion measurements, for example, is a technical expert called in for general trouble-shooting, even without there being specific problems with an ongoing measurement.

SUMMARY OF THE INVENTION

An object of the invention is to address the problem of providing a medical imaging apparatus and a method for operating a medical imaging apparatus, and a non-transitory data storage medium encoded with programming instructions, with which an improvement in the image quality of the images acquired using the medical imaging apparatus is possible.

This problem is solved in accordance with the invention by a method for operating a medical imaging apparatus, in which an evaluation field to evaluate the image quality of the at least one image is displayed on at least one processed image.

The basis of the invention is considered to be simplifying the input of an image evaluation with regard to the image quality such that, in the optimum scenario, an evaluation is available for each image that has been acquired or for each image series.

Here, an image is understood to be an individual image and an image series is understood to be a series of images that have been acquired together. An image series is available, for instance, in measurement data that form the basis of T1, T2, T2* or B1 maps, in interleaved sequences, in cine recordings, multi-slice measurements, and so on.

It would be fundamentally possible for a number of evaluations to be issued for a number of images in an image series, but this obstructs the primary aim, which is a fast evaluation.

A simplification can be made for image series, by selecting the worst of all the evaluation possibilities that emerge from the individual images.

The method in accordance with the invention is intended to lead to a fast and efficient detection of problems, and not to cause time-consuming additional work.

The evaluation field is designed for the entry of at least one information item. This can ensue by a single mouse click. A further simplification is achieved if one standard value is already preset, in particular the value for an optimum image quality. Then the user, assuming that he or she is satisfied, does not need to make any explicit input.

The image quality is a subjective evaluation criterion, as opposed to SNR or CNR, for instance. But this is precisely what makes it possible to ascertain how satisfied the users are with the results of individual measurement sequences.

The evaluation field is preferably designed as a drop-down menu, so as to drop down when traversed or touched. The user works on a monitor, which can, but does not have to be, designed as a touchscreen. The type of contact between the user and screen or monitor is therefore dependent on the type of user input. The input of evaluation data is not changed as far as the content is concerned. The drop-down design has the purpose of taking up as little of the image area as possible, until the user is ready to carry out a quality evaluation. The drop-down can ensue in any direction, that is, upward and downward and on both sides. Before it drops down, the evaluation field can therefore be designed as an icon that is converted into an input mask after it drops down.

With this design, a number of preset categories are preferably displayed with respect to the image quality. Depending on the degree of differentiation, at least two categories are to be provided. Three categories are preferred. The value of the categories can again be symbolized by icons. As a result, the evaluation can be intuitive.

Three categories are preferably preset, for instance image quality categories of "good", "average" and "poor". A more precise differentiation tends to lead to selection problems for users.

It is therefore advantageous, if at least one help symbol is displayed in the dropped-down evaluation field, with a link to a help page. Here information can be provided to the user, for example, as to when an image is to be graded as "good", "average" or "poor".

In addition, the user data can include a number of input categories in an evaluation field, such that the cause of error is easier to identify.

Moreover, the evaluation data that are storable in this way can be more systematically evaluated and displayed. In particular, they will be available not only to technical experts but also to later users as well.

Preferably, an input field and/or a selection field is displayed in each case for specific evaluation data, with an input field being designed for a manual user input, and a selection field allows the user to make a selection from a plurality of suggestions. Basically, single and multiple selections are possible.

Apart from measurement sequence-related problems, there are also unavoidable problems that are intrinsically patient-related. These include, for instance, extreme weight values, which may lead, for example, to the suboptimal loading of a coil. These data are referred to hereinafter as patient-related data. If the problem arises more frequently in this context, the technical experts can test a hardware acquisition. In such patient-related data, an input by the user is not absolutely necessary. These data can be acquired automatically from the data that are available for each measurement, for example, height and weight have to be compulsorily entered during each patient registration—and the corresponding extreme values can therefore be automatically entered into the input field since they are already known in the system. The automatically acquired data are preferably displayed in an input field and optionally corrected by the user.

An input field and/or a selection field for measurement-related data can additionally be displayed as a further field. Measurement-related data include incidents during the measurement, because for example, the patient is not cooperating as required.

For example, many sequences require patients to hold a breath for some time. This is not possible for every subject/ every patient. It is also possible that subjects may move during the measurement.

An evaluation status is preferably stored. Unlike the actual evaluation data, the evaluation status merely states whether an evaluation is available. The evaluation status is therefore generated automatically when the user has interacted with the evaluation field.

If the possibility exists that the user, as described above, has made an evaluation even without any interaction, then the evaluation status can be stored when closing the image, when logging out, or during a different action on the part of the user. The aim of the evaluation status is to no longer display the evaluation field when the image is next opened. The user's evaluation usually occurs only once.

This does not preclude the possibility of the evaluations being converted retrospectively due to the acquisition of additional knowledge. It is only the display of an evaluation field on the image itself that no longer appears automatically but only as a result of clicking on the mouse or the like.

Measurement sequence-related data can be automatically stored as evaluation data. Alongside the image quality, which the user evaluates subjectively, other values may also be of interest. These can be the measurement sequence, and hardware information such as coils, slice positions, and so on. These are usually stored automatically on an imaging apparatus and do not have to be entered by the user. The evaluation of the image quality thus can be carried out in a more error-free and rapid manner.

During the selection and/or setting of a measurement sequence, stored evaluation data are preferably displayed. Preferably, only the stored evaluation data relating to this measurement sequence and/or to the coil used will be displayed. Then a subsequent user will be able to detect, for example, that the coil, the measurement sequence or the like has caused problems with the last measurement or measurements and can still change it where a selection option exists. In particular, if a measurement sequence with disadvantageous settings has been stored, it is not immediately apparent.

In an embodiment, the displayed and/or stored evaluation data or the processed images that were evaluated therewith can be grouped according to a selectable criterion, for example, according to the image quality. Then for example, the "poor" images can be viewed in a more simple manner one after another, which simplifies the trouble-shooting. Furthermore, a grouping according to further properties is also possible, for instance, only "good" images/series in the context of "extreme weight values".

The present invention also encompasses a medical imaging apparatus with a control computer, wherein the control computer is programmed to operate the medical imaging apparatus in order to implement any or all of the embodiments of the method as described above. The medical imaging apparatus can be a magnetic resonance apparatus, an ultrasound apparatus, an x-ray apparatus, a computed tomography apparatus, or a hybrid modality wherein one or more of those different modalities are combined into a single apparatus. The medical imaging apparatus in accordance with the invention can also be a PET or an SPECT installation.

The present invention also encompasses a non-transitory, computer-readable data storage medium that is encoded with programming instructions that, when the storage medium is loaded into a control computer of a medical imaging apparatus, cause the control computer to implement the method as described above when the programming instructions are executed by the control computer.

BRIEF DESCRIPTION OF THE DRAWINGS

FIG. 1 schematically illustrates a magnetic resonance apparatus of the type with which the invention can be implemented.

FIG. 2 is a schematic illustration of a screen display in a first embodiment of the invention.

FIG. 5 is a schematic illustration of a screen display in a fourth embodiment of the invention.

FIG. 6 is a schematic illustration of a screen display in a fifth embodiment of the invention.

FIG. 7 is a schematic illustration of a screen display in a sixth embodiment of the invention.

FIG. 8 is a flowchart for operating a magnetic resonance apparatus in accordance with the invention.

DESCRIPTION OF THE PREFERRED EMBODIMENTS

Figure 3:
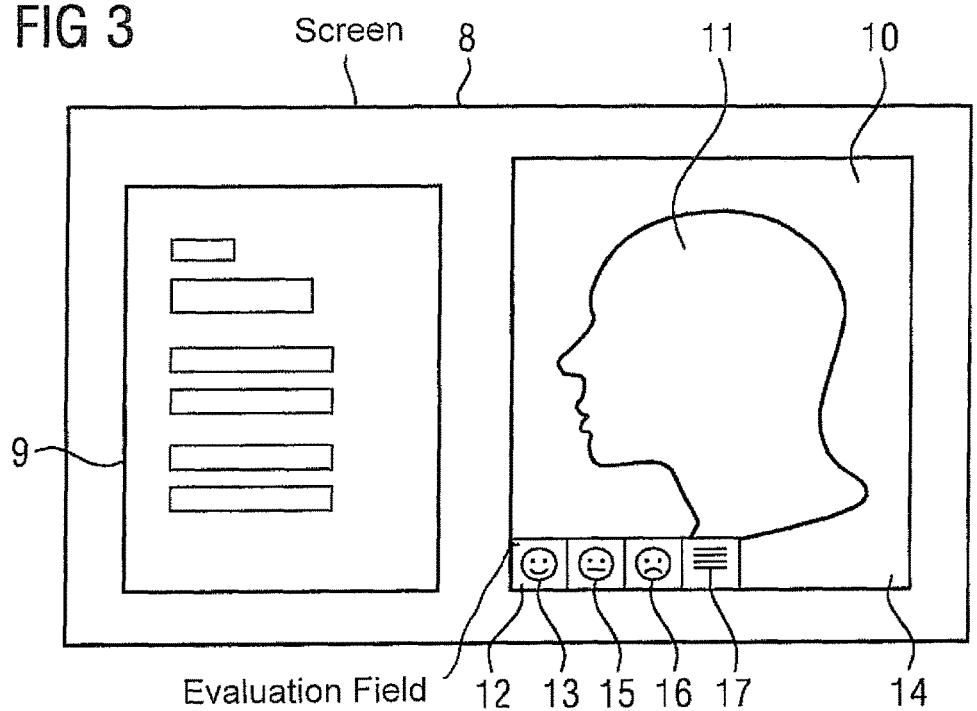
FIG. 3 is a schematic illustration of a screen display in a second embodiment of the invention.

FIG. 1 shows a magnetic resonance apparatus 1. Along with the magnetic resonance data acquisition scanner 2, it also has a workstation 3 with a control computer 4. The control computer 4 has at least one processor 5 and at least one data carrier 6.

The workstation 3 is usually separated from the magnet area in which the magnetic resonance scanner 2 is located. The workstation 3 also has at least one screen 7. An operator can therefore carry out magnetic resonance examinations from the workstation 3.

The workstation 3 can also be used to generate and evaluate images during ongoing measurements or for preparing measurements. A preferred design of the workstation 3 provides two screens 7 and 8, one of the screens being provided to carry out measurements and the other screen being used for evaluations.

FIG. 2 shows the screen 8 as an evaluation screen. Together with an input mask 9 for the entry of evaluation parameters, there is also a finished processed image 10. The image 10 shows a head 11 of a patient. The image 10 has motion artifacts that the patient has generated during a movement.

An evaluation field 12 is provided for a quick evaluation of the image. The field includes an icon 13 for intuitive use. The evaluation field 12 has not dropped down, such that it does not noticeably cover the image without user interaction. The evaluation field 12 is therefore arranged in one of the corners 14 of the image 10. In the corners 14 there is usually only a noise signal. Advantageously, the corner 14 can also be detected in an automated manner using the minimal SNR.

FIG. 3 shows an evaluation field 12 that has dropped down, in a first embodiment, in which the evaluation field comprises four icons 13, 15, 16 and 17. With the icons 13, 15 and 16, an evaluation of the image quality of the image 10 can be made. The image quality therefore has three categories in which, as is self-explanatory, icon 13 represents the category "good", icon 15 the category "average", and icon 16 the category "poor".

Icon 17 can be used to open a further input window 18 for more detailed data. In its content, this input window 18 is part of the evaluation field 12, but can be designed as a stand-alone window.

Figure 4:
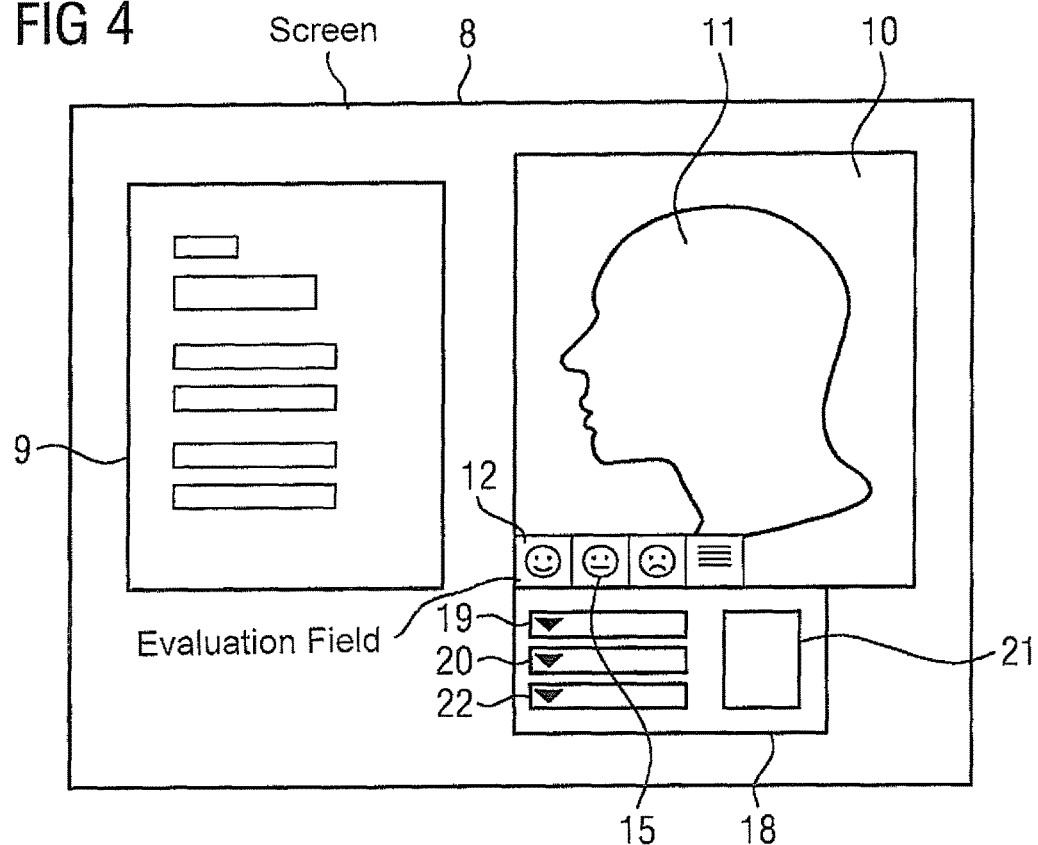
FIG. 4 is a schematic illustration of a screen display in a third embodiment of the invention.

FIG. 4 alternatively shows the input window 18 as an integral part of the evaluation field 12 that has dropped down. Here the input window 18 has a selection field 19 for patient-related data, a selection field 20 for measurement-related data, a free text field 21 and a selection field 22 that relates to the diagnostic line of questioning.

These fields can be filled in to complete the evaluation of the image quality. Completing the fields is important if they provide a different reason for a poor image quality other than measurement sequence-related reasons.

Measurement-related questions such as those asked in selection field 22 can also be input during the setup of a patient measurement. Then these data can be stored automatically too without the user having to make an input. Accordingly, provision can be made for the selection field 22 to be displayed only when the relevant information is not yet available.

By selecting one of the icons 13, 15 or 16, an evaluation status can be stored. Then in a future display of the image 10, the evaluation field 12 is no longer automatically displayed but is now only accessible via a menu. Alternatively, icon 13 can be reduced in size or moved to a less conspicuous position.

FIG. 5 shows an image series 23 with images 24, 25, 26 and 27. Here images 24, 25, 26 and 27 can be images that were acquired with a different repetition time, in order to create a T1 map therefrom. Here, depending on the representation, either one single evaluation field 12 is displayed for all the images 24, 25, 26 and 27 in image series 23 or one field for the respective image shown in image series 23. Here the evaluation data relate only to image series 23, however. Image series 23 therefore includes only one evaluation data set. Therefore, for rapid detection of measurement problems, out of images 24, 25, 26 and 27 the image with the poorest image quality is the one that is evaluated. If image 25 is of average quality and images 24, 26 and 27 are of good image quality, then the user activates icon 15.

As there are also image series with an extremely large number of individual images, an individual evaluation would take up too much time. Alternatively, an individual evaluation can be carried out depending on the number of individual images in an image series 23. For up to three images, an individual evaluation ensues and a combined evaluation from four individual images upwards.

FIG. 6 shows a list 28 of measurement protocols for a specific diagnostic line of questioning. It shows in the center column the evaluations carried out using icons 13, 15 and 16 and the left column shows the log. A subsequent user can thus be alerted in a simple manner to problems with a measurement sequence. If additional comments are also shown in the right column, it is also possible to see right away if the reason for the poor image quality was only due to an uncooperative patient.

FIG. 7 shows a table 29 that can be displayed to a technical specialist. Here, for example, all the evaluations for a specific measurement sequence are displayed and the list 29 is sorted according to these evaluations. If many evaluations exist that display an average image quality and there is no external reason for this, it may be advisable to check the magnetic resonance apparatus 1.

FIG. 8 is a flowchart of a method for operating a magnetic resonance apparatus 1.

In step S1 an image data set is acquired. This is processed into an image 10 in step S2. Such processing steps are necessary on most imaging modalities. Step S2 can therefore be skipped if the imaging apparatus directly generates an image 10.

In step S3 the image 10 is displayed on a screen 8 together with an evaluation field 12. Here, the screen 8 can form part of a workstation 3 on an imaging modality such as a magnetic resonance apparatus 1, but it can also be a screen on a workstation at any location in the world. Since the measurement data can be made available world-wide, no limits exist with regard to the place of evaluation.

If in step S4 the user traverses icon 13 with the mouse, then the evaluation field 12 drops down.

In step S5 the user selects one of the icons 13, 15 or 16 to evaluate the image quality of the image 10.

In step S6 the selection fields 19, 20 and 22 are likewise activated if necessary.

After leaving the evaluation field 12, an evaluation status is automatically stored as step S7.

It is self-evident that the method according to the invention and likewise the magnetic resonance apparatus 1 according to the invention are closely linked, and that features of the invention that have been described as process features can also be implemented by physical components of the magnetic resonance apparatus 1.

Moreover, it is also self-evident that the method described can be equally well implemented by an ultrasound device, an X-ray apparatus, a CT apparatus, a hybrid modality including MR and CT, MR and PET, MR and SPECT, and so on. A magnetic resonance apparatus is only a preferred embodiment of the medical imaging modality.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method for operating a medical imaging apparatus comprising:

operating a medical image data acquisition scanner in order to acquire medical imaging data from a subject that are acquired in order to make a medical diagnosis of the subject;

in a processor, reconstructing a medical image from the medical image data(b), said medical image having an overall appearance that gives said medical image an image quality;

displaying said medical image at a display screen in communication with said processor while simultaneously displaying at least one evaluation field at said display screen;

in said evaluation field at said display screen, displaying a plurality of individually actuatable icons that respectively symbolize a same plurality of different levels of evaluation as to a degree to which said image quality of said medical image is acceptable to a viewer of the display screen for making said medical diagnosis;

receiving a viewer input into said processor resulting from an actuation of one of said icons in said evaluation field;

in said processor, deriving an evaluation status of said displayed image from said viewer input to said evaluation field, and storing said evaluation status, linked to said medical image, in a memory in communication with said processor as a data file; and via said processor, making the data file available for viewing at said display screen upon receipt by said processor of a subsequent request to access said data file from said memory.

2. A method as claimed in claim 1 comprising, in said processor, configuring and displaying said evaluation field as a drop-down menu that drops down when said display screen is traversed or touched.

3. A method as claimed in claim 1 comprising acquiring said raw data by operating said data acquisition scanner to execute a measurement sequence, and storing data representing said measurement sequence linked with said evaluation status.

4. A method as claimed in claim 3 comprising, prior to beginning operation of said data acquisition scanner with said measurement sequence to execute a subsequent acquisition of subsequent medical image data, displaying, at said display screen, said data describing said measurement sequence.

5. A method as claimed in claim 4 comprising displaying said data describing said measurement sequence at said display screen grouped according to a selectable criterion.

6. A method as claimed in claim 5 wherein said selectable criterion is said image quality.

7. A medical imaging apparatus for operating a medical imaging apparatus comprising:

a medical image data acquisition scanner;

a processor configured to operate the medical image data acquisition scanner in order to acquire medical imaging data from a subject that are acquired in order to make a medical diagnosis of the subject;

said processor being configured to reconstruct a medical image from the medical image data, said medical image having an overall appearance that gives said medical image an image quality;

a display screen in communication with said processor, said processor being configured to display the medical image at the display screen and, in the displayed medical image, to simultaneously display at least one evaluation field at said display screen;

said processor being configured to display, in said evaluation field at said display screen, a plurality of individually actuatable icons that respectively symbolize a same plurality of different levels of evaluation as to a degree to which said image quality of said medical image is acceptable to a viewer of the display screen for making said medical diagnosis;

said processor being configured to receive a viewer input into said processor resulting from an actuation of one of said icons in said evaluation field;

said processor being configured to derive an evaluation status of said displayed image from said viewer input to said evaluation field, and to store said evaluation status, linked to said medical image, in a memory in communication with said processor as a data file; and said processor being configured to make the data file available for viewing at said display screen upon receipt by said processor of a subsequent request to access said data file from said memory.

8. A non-transitory, computer-readable data storage medium encoded with programming instructions, said storage medium being loaded into a control computer of a medical imaging apparatus that comprises a medical image data acquisition scanner, said programming instructions causing said control computer to:

operate the medical image data acquisition scanner in order to acquire medical imaging data from a subject that are acquired in order to make a medical diagnosis of the subject;

reconstruct a medical image from the medical image data, said medical image having an overall appearance that gives said medical image an image quality;

display said medical image at a display screen in communication with said processor and, in the displayed medical image, also display at least one evaluation field that evaluates an image quality of the displayed medical image;

in said evaluation field at said display screen, display a plurality of individually actuatable icons that respectively symbolize a same plurality of different levels of evaluation as to a degree to which said image quality of said medical image is acceptable to a viewer of the display screen for making said medical diagnosis;

receive a viewer input into said processor resulting from an actuation of one of said icons in said evaluation field;

derive an evaluation status of said displayed image from said viewer input to said evaluation field, and store said evaluation status, linked to said medical image, in a memory in communication with said processor as a data file; and make the data file available for viewing at said display screen upon receipt by said processor of a subsequent request to access said data file from said memory.

* * * * *